(12) United States Patent
Bell et al.

(10) Patent No.: US 11,901,574 B2
(45) Date of Patent: Feb. 13, 2024

(54) APPARATUS FOR COMPRESSING BATTERY CELLS IN A BATTERY MODULE

(71) Applicant: Caterpillar Inc., Peoria, IL (US)

(72) Inventors: Brian R. Bell, West Lafayette, IN (US); Adam R. Rosenberger, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 22 days.

(21) Appl. No.: 17/490,808

(22) Filed: Sep. 30, 2021

(65) Prior Publication Data

US 2023/0097536 A1 Mar. 30, 2023

(51) Int. Cl.
*H01M 50/262* (2021.01)
*H01M 50/209* (2021.01)
*H01M 50/258* (2021.01)
*H01M 10/04* (2006.01)

(52) U.S. Cl.
CPC ..... *H01M 50/262* (2021.01); *H01M 10/0481* (2013.01); *H01M 50/209* (2021.01); *H01M 50/258* (2021.01); *H01M 2220/20* (2013.01)

(58) Field of Classification Search
CPC .......... H01M 50/262; H01M 10/0481; H01M 50/209; H01M 50/258; H01M 2220/20
See application file for complete search history.

(56) References Cited

U.S. PATENT DOCUMENTS

| 6,190,793 | B1 * | 2/2001 | Barton | .................. | H01M 8/242 |
| | | | | | 429/511 |
| 8,574,750 | B2 | 11/2013 | Tsutsumi et al. | | |
| 9,200,428 | B2 | 12/2015 | Miyatake | | |
| 2005/0236058 | A1 * | 10/2005 | Kamiyama | ............... | F16L 7/00 |
| | | | | | 264/269 |
| 2016/0164061 | A1 * | 6/2016 | Han | .................... | H01M 50/209 |
| | | | | | 429/120 |

(Continued)

FOREIGN PATENT DOCUMENTS

DE 102014221944 A1 4/2016
DE 102017119467 A1 2/2019

(Continued)

OTHER PUBLICATIONS

Machine translation of WO-2021008826-A1, obtained from PE2E. (Year: 2021).*

(Continued)

*Primary Examiner* — Milton I Cano
*Assistant Examiner* — Oscar Londono
(74) *Attorney, Agent, or Firm* — Lee & Hayes (57) ABSTRACT

A battery module includes a housing, battery cells disposed within the housing, and a wedge apparatus disposed within the housing and configured to exert a substantially constant force on the battery cells. The wedge apparatus includes a first wedge having a first thick end tapering to a first thin end, and a second wedge having a second thick end tapering to a second thin end, the first wedge and the second wedge positioned such that the first wedge and the second wedge at least partially overlap. The wedge apparatus further includes (Continued)

a tensioning mechanism disposed at least partially in the first opening and the second opening and configured to move the first wedge in a first direction relative to the second wedge causing a width of the wedge apparatus to expand and exert a first force on the plurality of battery cells.

14 Claims, 5 Drawing Sheets

(56) References Cited

U.S. PATENT DOCUMENTS

| | | | |
|---|---|---|---|
| 2017/0244088 A1* | 8/2017 | Narbonne | H01M 50/293 |
| 2020/0343498 A1 | 10/2020 | Schuessler et al. | |
| 2021/0151830 A1 | 5/2021 | Shayan et al. | |

FOREIGN PATENT DOCUMENTS

| | | | |
|---|---|---|---|
| DE | 102018103305 A1 | | 8/2019 |
| DE | 102019004891 A1 | | 1/2021 |
| JP | 3224033 U | * | 11/2019 |
| WO | 2019171469 A1 | | 9/2019 |
| WO | 2021008826 A1 | | 1/2021 |

OTHER PUBLICATIONS

Machine translation of JP3224033U, obtained from PE2E. (Year: 2019).*

Written Opinion and International Search Report for Int'l. Patent Appln. No. PCT/US2022/043276, dated Dec. 19, 2022 (11 pgs).

* cited by examiner

APPARATUS FOR COMPRESSING BATTERY CELLS IN A BATTERY MODULE

TECHNICAL FIELD

The present disclosure relates to an apparatus for compressing battery cells within a battery module. More specifically, the present disclosure relates to a wedge apparatus that is adjustable in order to exert a force on battery cells of a battery module when the wedge apparatus is placed between a housing of the battery module and the battery cells of the battery module. The force provided by the wedge apparatus reduces and/or slows swelling of the battery cells over a usable life thereof, which improves performance, extends the usable life, and provides increased mechanical stability for the battery cells.

BACKGROUND

Battery modules are used in a variety of applications in order to provide and store energy. For example, battery modules are increasingly implemented in vehicles, equipment, and other machines. Each battery module typically includes a plurality of battery cells arranged therein. Battery cells tend to swell over a useable life of the battery cells due to temperature, age, and state of a charge of the battery cells. The battery cells often benefit from compression or other preload in order to secure the battery cells within a battery module or to ensure ideal function of the battery cells.

While various types of systems and devices are used to compress battery cells in a battery module, these systems and devices often increase complexity of a battery module configuration. As such, these systems and devices often add a significant amount of weight to the battery module and/or these systems and devices reduce an amount of space that is available within the battery module for storing additional battery cells, which can reduce power storage and output of the battery module. For example, mechanical systems and devices are often designed to remain static over the useable life of the battery cells. However, as the battery cells swell over the useable life of the battery cells, the battery cells can become over compressed which could impact performance or life of the battery cells as well as increase the potential for the battery cells to rupture or otherwise fail. As such, electrical compression systems and devices are used to compress battery cells and can adjust compression based on a state and/or size of the battery cells. However, electrical systems are often complex, cumbersome, heavy, and draw energy that could be used for other applications.

An example system for compressing battery cells in a battery module is described in World Intellectual Property Organization (WIPO) Patent Application No. 2021/008826A1 (hereinafter referred to as the '826 reference). In particular, the '826 reference describes a clamping element that is placed between a housing of a battery system and a battery cell. The '826 reference describes that the clamping element includes two wedge-shaped elements that are arranged adjacent to one another. The '826 reference also describes that a position of the two wedge-shaped elements is adjustable in order to provide an adjustable force that is exerted on the battery cell. Furthermore, the '826 reference describes that once the position of the clamp element adjusted, the position of the clamp element remains constant during a service life of the battery cell. Accordingly, the '826 reference describes that the force exerted on the battery cell as the battery cell increases in size due to swelling will increase. Indeed, the '826 reference states that, as the battery cells swell over the service life of the battery cells, the force exerted on the battery cells can reach a force ten times greater than the force exerted on the battery cells at installation. As a result, the '826 reference could over compress the battery cells, which could adversely affect performance of the battery cells and could increase the potential for the battery cells to rupture or otherwise fail.

Example embodiments of the present disclosure are directed toward overcoming the deficiencies described above.

SUMMARY

An example battery module includes a housing, a plurality of battery cells disposed within the housing, and a wedge apparatus disposed within the housing. The wedge apparatus includes a first wedge having a first thick end tapering to a first thin end and a first opening formed through at least a portion of the first wedge and a second wedge having a second thick end tapering to a second thin end and a second opening formed through at least a portion of the second wedge, the first wedge and the second wedge configured to at least partially overlap. The wedge apparatus further includes a bolt configured to be inserted at least partially into the first opening, the bolt including threading formed in at least a portion of a shaft of the bolt and a threaded sleeve inserted at least partially within the second opening and configured to receive the bolt therein such that rotating the bolt in a first rotational direction causes the first wedge to move in a first direction relative to the second wedge, thereby causing a width of the wedge apparatus to expand increasing a first force applied to the plurality of battery cells. The plurality of battery cells exert a second force on the wedge apparatus as the plurality of battery cells expand, and the threaded sleeve includes at least a portion that is configured to deform once the second force is substantially equal to or exceeds a threshold force.

An example wedge apparatus includes a first wedge having a first thick end tapering to a first thin end and a first opening formed through at least a portion of the first wedge and a second wedge having a second thick end tapering to a second thin end and a second opening formed through at least a portion of the second wedge, the first wedge and the second wedge configured to at least partially overlap. The wedge apparatus further includes a bolt configured to be inserted in the first opening, the bolt including a threaded shaft and a threaded sleeve disposed within the second opening and configured to receive the threaded shaft of the bolt therein such that rotating the bolt in a first rotational direction causes the first wedge to move in a first direction relative to the second wedge causing a width of the wedge apparatus to expand. The threaded sleeve includes a portion thereof that is configured to deform if a force exerted on the threaded sleeve is substantially equal to or exceeds a threshold force.

In a further example, an example battery module includes a housing, a plurality of battery cells disposed within the housing, and a wedge apparatus disposed within the housing and configured to exert a substantially constant force on the plurality of battery cells. The wedge apparatus includes a first wedge having a first thick end tapering to a first thin end, the first wedge including a first opening formed through at least a portion of the first wedge and a second wedge having a second thick end tapering to a second thin end and a second opening formed through at least a portion of the second wedge, the first wedge and the second wedge positioned such that the first thin end and the second thin end at least partially overlap. The wedge apparatus also includes a tensioning mechanism disposed at least partially in the first opening and the second opening and configured to move the first wedge in a first direction relative to the second wedge causing a width of the wedge apparatus to expand and exert a first force on the plurality of battery cells. The plurality of battery cells exert a second force on the wedge apparatus as the plurality of battery cells expand and the tensioning mechanism includes a portion thereof that is configured to deform once the second force is equal to or exceeds a threshold force.

DETAILED DESCRIPTION

Figure 1:
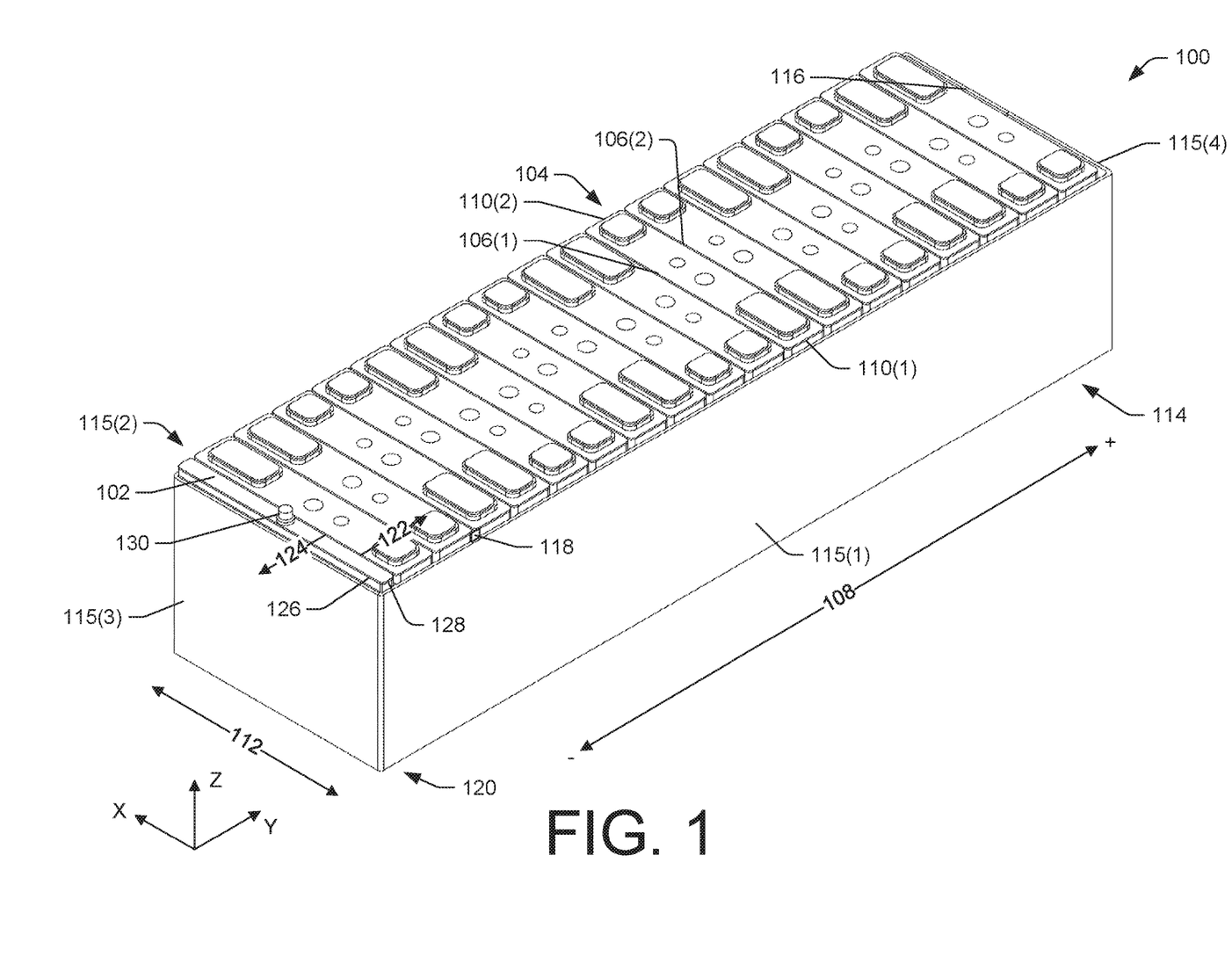
FIG. 1 is a perspective view of an example battery module having a wedge apparatus for compressing battery cells in accordance with an example of the present disclosure.

FIG. 1 depicts a perspective view of an example battery module 100 having a wedge apparatus 102. The battery module 100 is comprised of one or more battery cells 104 that are electrically connected to one another in order to form the battery module 100. As described further herein, the wedge apparatus 102 is adjustable in order to exert a force on the battery cells 104. Such a force may at least partially compress the battery cells 104 and may improve performance and/or extend a battery life of the battery cells 104. In some examples, the battery module 100 supplies electrical power to a machine to which the battery module 100 is coupled. The battery module 100 may also receive and store electrical power from various sources. In some examples, multiple battery modules, which may include similar housings, battery cells, and wedge apparatuses, are electrically coupled to one another and the machine in order to provide a desired power output and voltage output for the machine. Similarly, multiple battery modules may be electrically coupled to one another in order to receive and supply electrical power from the various sources.

In some examples, the battery cells 104 may include any capacity, voltage, energy, or other cell parameter. The battery cells 104 may comprise lithium ion battery cells. Additionally, and/or alternatively, the battery cells 104 may comprise other chemicals that are used to provide a rechargeable battery cell. Each battery cell of the battery cells 104 includes a battery (or useable/serviceable) life that is typically determined by a number of full charge to discharge cycles until the battery cell reaches a predetermined failure threshold that is defined by capacity loss or a rise in impedance. For example, the battery life of a battery cell 104 may be determined by a number of cycles (e.g., full charge-discharge) that the battery cell 104 is capable of completing until a capacity, impedance, or other parameter the battery cell 104 reaches or drops below a predetermined threshold (e.g., 80% of original capacity). The battery life of the battery cells 104 may be directly affected by various factors including, but not limited to, temperature, charge/discharge current, and/or state of charge ranges (e.g., depth of discharge).

Over the course of the battery life of the battery cells 104, the battery cells 104 may swell or expand. Typically, battery cells 104 will tend to bulge outward from long sides 106(1) and 106(2) of the battery cells 104 due to the decreased resistance along the long sides 106(1) and 106(2) of the battery cell 104. In other words, the battery cells 104 may tend to swell outward in a direction 108 along the Y-axis, as shown in FIG. 1. Additionally, and/or alternatively, the battery cells 104 may swell outward from short sides 110(1) and 110(2) of the battery cell 104. In other words, the battery cells 104 may tend to swell outward in a direction 112 along the X-axis, as shown in FIG. 1. In some examples, the swelling of the battery cells 104 in the direction 108 along the Y-axis may be greater than the swelling of the battery cells 104 in the direction 112 along the X-axis. Such swelling or expansion may be due to various factors. For example, the battery cells 104 may expand and/or contract as the battery cells 104 charge and discharge. As such, the battery cells 104 may include varying thickness based on the state of charge of the battery cells 104 depending on a state of charge of the battery cells 104. Furthermore, the battery cells 104 may irreversibly swell based on a chemical reaction occurring within the battery cells 104 due to charge and discharge over the battery life of the battery cells 104.

In some examples, compressing the battery cells 104 may ensure ideal performance of the battery cells 104, extend the battery life of the battery cells 104, or slow the swelling of the battery cells 104, among other potential benefits. As will be described further herein, the wedge apparatus 102 is adjustable in order to provide a compressive force that is exerted on the battery cells 104. Conversely, without compression, swelling may occur faster in the battery cells 104 which may negatively impact performance of the battery cells 104 and result in a reduced battery life of the battery cells 104. Furthermore, compression of the battery cells 104 may help secure the battery cells 104 within a housing 114 of the battery module 100, which may be beneficial in mobile applications where the battery module 100 is subject to acceleration, deceleration, or other movement.

The housing 114 of the battery module 100 may be comprised of aluminum, steel, or any other suitable material. In some examples, the housing 114 may be a preformed housing 114 and the battery cells 104 and the wedge 102 apparatus may be disposed within the housing 114 after the housing 114 is formed. In other words, the housing 114 may be formed from independent portions (or plates) that are welded or otherwise coupled together prior to disposing the battery cells 104 and/or the wedge apparatus 102 within the housing. Alternatively, the housing 114 may be formed from independent plates that are placed around the battery cells 104 and the wedge apparatus 102 and the independent plates may be welded or otherwise coupled to each other in order to form the housing 114 around the battery cells 104 and the wedge apparatus 102.

In some examples, the housing 114 includes multiple plates 115 coupled together to form the housing. For example, the housing 114 includes a first plate 115(1) and a second plate 115(2) extending in a substantially parallel direction such that the first plate 115(1) and the second plate 115(2) extend along the Y-axis, as shown in FIG. 1. The first plate 115(1) and the second plate 115(2) define respective sides of the housing 114. Furthermore, the housing 114 may include a third plate 115(3) and a fourth plate 115(4). The third plate 115(3) and the fourth plate 115(4) may be coupled to respective ends of the first plate 115(1) and the second plate 115(2) and may define respective ends of the housing 114. The housing 114 may also include a bottom plate (now shown in FIG. 1) coupled to a bottom side of the housing 114. Alternatively, in some examples, the bottom plate may be omitted. In some examples, the plates 115 of the housing 114 may be coupled together, thereby defining an interior surface 116 of the housing 114.

As shown in FIG. 1, the housing 114 may include a single row of battery cells 104 disposed therein. Alternatively, in some examples, the housing 114 may be sized to accommodate multiple rows of battery cells 104 therein. In some examples, the battery module 100 may include a compressible material 118 that is inserted between various components. The compressible material 118 may be made of foam, plastic, rubber, polymer, or any other suitable compressible and/or non-conductive material. In some examples, the compressible material 118 may be disposed between individual battery cells of the battery cells 104 in the housing 114. Additionally, compressible material may be disposed between the battery cells 104 and the wedge apparatus 102 and between the wedge apparatus 102 and the housing 114.

The compressible material 118 may be at least partially compressed by a force exerted on the battery cells 104 by the wedge apparatus 102. The force and the compressible material 118 create a secure, tight fit for the battery cells 104 to be secured within the housing 114, without requiring fasteners to secure the battery cells 104 within the housing. Furthermore, the compressible material 118 allows the battery cells 104 to expand over the battery life of the battery cells 104. For example, the compressible material 118 provides a tight fit for the battery cells 104, but also provides room for expansion as the battery cells 104 expand with use.

As mentioned previously, the battery module 100 includes a wedge apparatus 102 disposed therein. As shown in FIG. 1, the wedge apparatus 102 may be disposed within the housing 114 proximate an end 120 of the housing 114. While FIG. 1 depicts a single wedge apparatus disposed within the housing 114, multiple wedge apparatuses may be disposed within the housing 114. For example, the battery module 100 may include a wedge apparatus 102 disposed proximate each end of the housing 114. However, a single wedge apparatus may be implemented in order to maximize space within the housing 114 for the battery cells 104. Furthermore, in an example where the battery module 100 includes multiple rows of battery cells 104 disposed within the housing 114, each row of battery cells 104 may include a dedicated wedge apparatus 102.

The wedge apparatus 102 may be configured to exert a first force 122 on the battery cells 104. For example, when the wedge apparatus 102 is disposed within the housing 114, the wedge apparatus 102 may be adjusted to exert a second force 124 on the housing 114 (e.g., the wedge apparatus 102 exerts the second force 124 on the third plate 115(3) of the housing 114), which in turn exerts the first force 122 on the battery cells 104. As such, the first force 122 and the second force 124 may be equal in force and opposite in direction. In some examples, the first force 122 that the wedge apparatus 102 exerts on the battery cells 104 may result in at least partial compression of one or more of the battery cells 104. Furthermore, the wedge apparatus 102 may be configured to apply the first force 122 substantially evenly across a surface of the battery cell 104 that is contacted by the wedge apparatus 102. For example, a length 126 of the wedge apparatus 102 may be sized to correspond with the long sides 106(1) and 106(2) of the battery cells 104 such that the wedge apparatus 102 applies a substantially even force across a long side 106(1) of the battery cell 104. As described previously, the battery cells 104 may expand over the battery life of the battery cells 104. By exerting the first force 122 on the battery cells 104 via the wedge apparatus 102, performance of the battery cells 104 may be improved, the battery life of the battery cells 104 may be extended, and/or the swelling of the battery cells 104 may be slowed, among other potential benefits.

In some examples, the force exerted on the battery cells 104 by the wedge apparatus 102 may be a predetermined force that is determined based at least in part on one or more of a quantity of battery cells 104 disposed within the housing, dimensions of the battery cells 104, a type of the battery cells 104, an application of the battery module 100, or other factors. Furthermore, the battery cells 104 may include a recommended compressive force (or force range) from a manufacturer of the battery cells 104. As such, the force may be set to comport with the recommended compressive force. Still further, the predetermined force may be determined based on beginning of life conditions for the battery cells 104 and/or end of life conditions for the battery cells 104. As is described further herein, the wedge apparatus 102 may be configured to ensure that the predetermined force exerted on the battery cells remains substantially constant over the battery life of the battery cells 104.

In some examples, the wedge apparatus 102 includes a tensioning mechanism 130. The tensioning mechanism 130 may be disposed at least partially within the wedge apparatus 102 and may be configured to adjust a position and/or size of the wedge apparatus 102, thereby adjusting the force that is exerted on the battery cells 104. For example, the wedge apparatus 102 includes a first wedge and a second wedge (shown and described with respect to FIGS. 2-4) that are disposed adjacent to each other and are moveable relative to each other via the tensioning mechanism 130. The tensioning mechanism 130 may adjust a vertical position (along the Z-axis) of the first wedge and/or the second wedge relative to each other such that an overall width 128 of the wedge apparatus 102 expands or contracts in the direction 108 along the Y-axis. For example, if the tensioning mechanism 130 is adjusted to expand the width 128 of the wedge apparatus 102, the force exerted on the battery cells 104 via the wedge apparatus 102 may increase. Conversely, if the tensioning mechanism 130 is adjusted to contract the width 128 of the wedge apparatus 102, the force exerted on the battery cells 104 via the wedge apparatus 102 may decrease.

As mentioned previously, battery cells 104 tend to expand over the battery life of the battery cells 104. As such, if a position of the tensioning mechanism 130 remains fixed, the first force 122 exerted on the battery cells 104 via the wedge apparatus 102 will increase and a pressure within the housing 114 of the battery module will increase commensurately. Such an increase in force could result in decreased performance of the battery cells 104, premature end of life of the battery cells 104, and/or damaged or ruptured battery cells 104, among other potential adverse effects. Furthermore, such an increase in force could also result in damage to or failure of the housing 114 of the battery module 100.

In some examples, at least a portion of the tensioning mechanism 130 may be configured to deform if the force (and/or pressure) is substantially equal to and/or exceeds a threshold force. For example, the tensioning mechanism 130 may include a deformable portion thereof (described further herein with respect to FIG. 4) that is configured to lengthen once the force exerted on the wedge apparatus 102 is substantially equal to and/or exceeds the threshold force. As a result, the width of the wedge apparatus 102 may be reduced, thereby relieving the force (and/or pressure) in order to prevent the force from exceeding the threshold force. Additionally, and/or alternatively, the tensioning mechanism 130 may be configured to deform in order to maintain a substantially constant force that is exerted on the battery cells 104. In other words, as the battery cells 104 expand over the battery life thereof, the tensioning mechanism 130 may be configured to deform, thereby allowing the width of the wedge apparatus 102 to contract, such that the force exerted on the battery cells 104 may remain substantially constant. In some examples, the wedge apparatus 102 may include other components or mechanisms that allow dimensions of the wedge apparatus 102 to be adjusted in response to the battery cells 104 expanding. As such, the wedge apparatus 102 described herein may prevent the force exerted on the battery cells 104 to remain below a predetermined threshold force and/or may be configured to maintain a substantially constant force that is exerted on the battery cells 104. These and other components and features of the wedge apparatus 102 are shown and described further herein.

Figure 2:
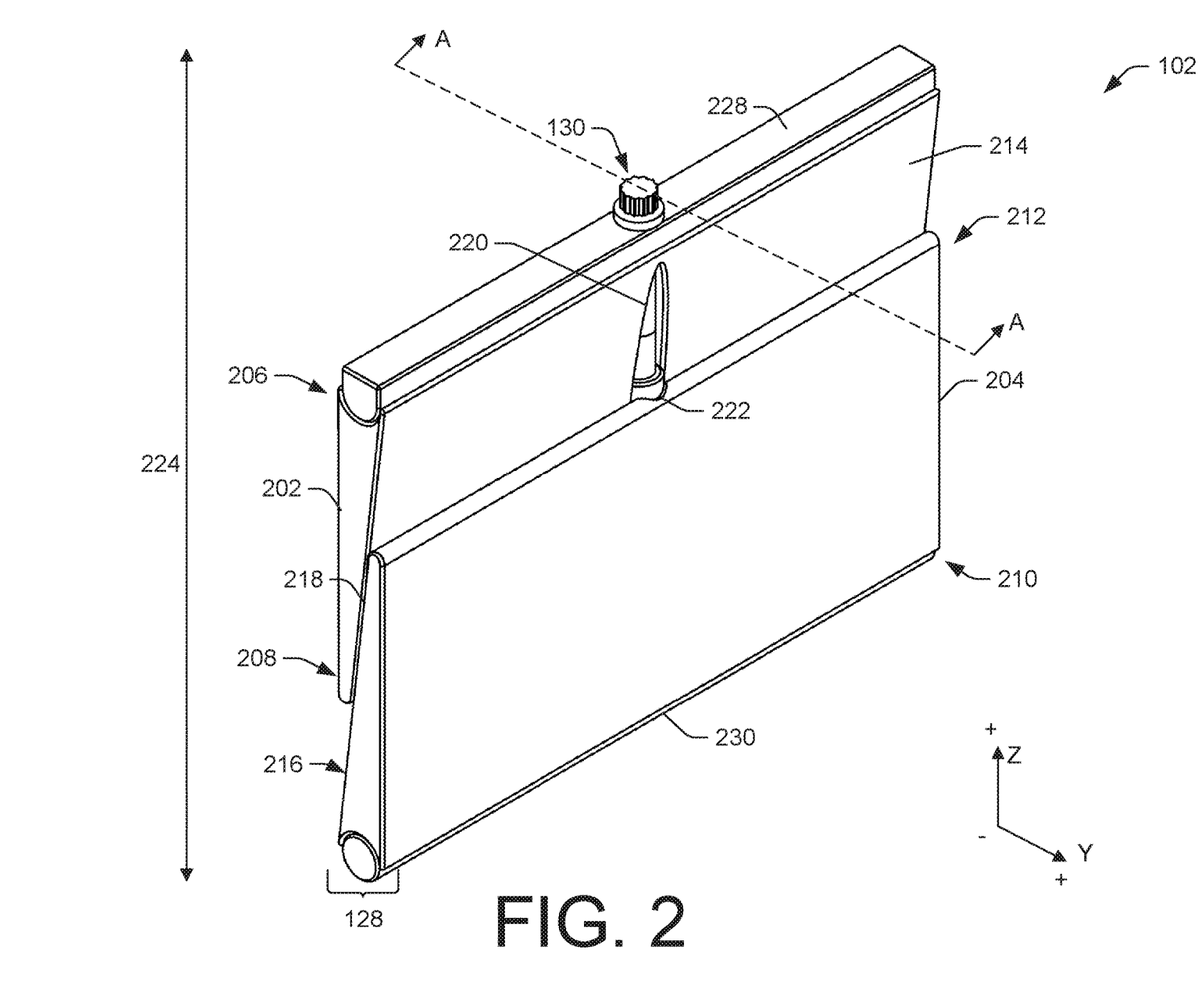
FIG. 2 is a perspective view of an example wedge apparatus in accordance with an example of the present disclosure.

FIG. 2 depicts a perspective view of the wedge apparatus 102 shown and described in FIG. 1. The wedge apparatus 102 includes a first wedge 202 and a second wedge 204. The first wedge 202 includes a first thick end 206 tapering to a first thin end 208. Likewise, the second wedge 204 includes a second thick end 210 tapering to a second thin end 212. In some examples, the first wedge 202 is positioned such that the first thick end 206 tapers to the first thin end 208 in a negative direction along the Z-axis, as shown in FIG. 2. Furthermore, the second wedge 204 is positioned such that the second thick end 210 tapers to the second thin end 212 in a positive direction along the Z-axis, as shown in FIG. 2. Furthermore, the first wedge 202 and the second wedge 204 are configured such that the first wedge 202 and the second wedge 204 at least partially overlap. For example, the first wedge 202 includes a first face 214 that extends between the first thick end 206 and the first thin end 208. As shown in FIG. 2, the first face 214 is positioned to face the second wedge 204. The second wedge 204 may likewise include a second face 216 that extends between the second thick end 210 and the second thin end 212. As such, when the first wedge 202 and the second wedge 204 at least partially overlap, the first face 214 may contact the second face 216 at a contact interface 218.

In some examples, the first wedge 202 and the second wedge 204 may be formed from a plastic material having a relatively high stiffness, low friction, and excellent dimensional stability. Such a material may include polyoxymethylene, ultra-high-molecular-weight poly ethylene (UHMWPE), aluminum with a polytetrafluoroethylene coating, or other material. In some examples, surfaces of the first wedge 202 and the second wedge 204 may be formed having a particular surface finish designed to control a friction coefficient between the first wedge 202 and the second wedge 204. For example, the first face 214 of the first wedge 202 and the second face 216 of the second wedge 204 may each include a surface finish. In some examples, the surface finish of the first face 214 and the second face 216 may a same or similar surface finish. However, in some examples, the surface finish of the first face 214 and the second face 216 may be substantially different. The surface finish of the first face 214 and the second face 216 may be configured such that when the first face 214 and the second face 216 contact each other at the contact interface 218, the first face 214 and the second face 216 include a friction coefficient therebetween that defines a force that resists movement of the first face 214 and/or the second face 216 relative to each other.

As shown in FIG. 2, the first wedge 202 may include a first opening 220 formed through at least a portion of the first wedge 202 and the second wedge 204 may include a second opening 222 formed through at least a portion of the second wedge 204. In some examples, the tensioning mechanism 130 may be disposed at least partially in the first opening 220 and the second opening 222 and is configured to adjust a position of the first wedge 202 and/or the second wedge 204 relative to each other. For example, the tensioning mechanism 130 may adjust a vertical position 224 of the first wedge 202 and the second wedge 204. Adjusting the vertical position 224 of the first wedge 202 relative to the second wedge 204 may result in a change in a width 128 of the wedge apparatus 102. As described previously, if the width 128 of the wedge apparatus 102 expands while the wedge apparatus 102 is disposed within the housing 114, the force exerted on the battery cells 104 by the wedge apparatus 102 may increase. Conversely, if the width 128 of the wedge apparatus is reduced, the force exerted on the battery cells 104 by the wedge apparatus 102 may decrease.

In some examples, the wedge apparatus 102 may include a first rail 228 configured to abut the first thick end 206 of the first wedge 202. The first rail 228 may distribute a force across the first thick end 206 of the first wedge 202, the force being exerted on the first wedge 202 by the tensioning mechanism 130. Likewise, the wedge apparatus 102 may include a second rail 230 configured to abut the second thick end 210 of the second wedge 204. The second rail 230 may distribute a force across the second thick end 210 of the second wedge 204, the force being exerted on the second wedge 204 by the tensioning mechanism 130. These and other components and features of the wedge apparatus 102 and the tensioning mechanism 130 are shown and described further herein.

Figure 3:
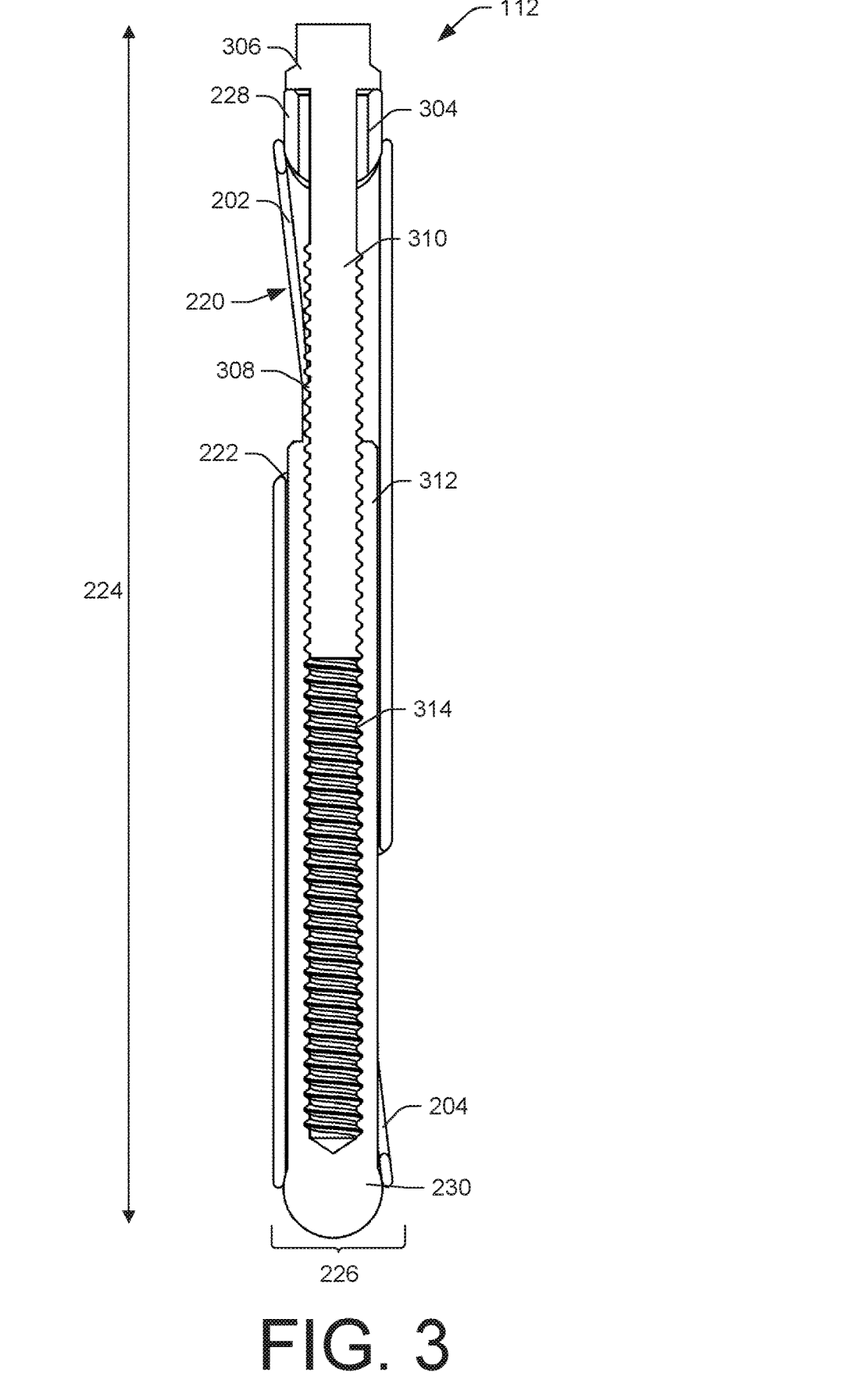
FIG. 3 is a cross-sectional view of the wedge apparatus shown in FIG. 2 taken along line A-A in accordance with an example of the present disclosure.

FIG. 3 depicts a cross-sectional view of the wedge apparatus 102 shown in FIG. 2, taken along line A-A. As mentioned previously, the wedge apparatus 102 includes a tensioning mechanism 130 configured to adjust a relative vertical position 224 of the first wedge 202 and the second wedge 204. The tensioning mechanism 130 may include a bolt 302 that is configured to be at least partially inserted into the first opening 220 of the first wedge 202. Furthermore, the first rail 228 may include an aperture 304 therein, through which the bolt 302 may be inserted such that a head 306 of the bolt 302 abuts the first rail 228. The bolt 302 includes threading 308 formed in at least a portion of a shaft 310 of the bolt 302.

The tensioning mechanism 130 may also include a threaded sleeve 312. The threaded sleeve 312 may be inserted at least partially within the second opening 222 of the second wedge 204. In some examples, the threaded sleeve 312 may be formed integral with and/or extend from the second rail 230. For example, the threaded sleeve 312 may extend from the second rail 230 through the second opening 222, which may extend through a height of the second wedge 204 such that the threaded sleeve 312 extends partially out of the second opening 222. The threaded sleeve 312 may include threading 314 therein that is configured to correspond with and receive the threading 308 of the bolt 302.

As such, the threaded sleeve 312 is configured to receive the bolt 302 therein such that rotating the bolt 302 in a first direction causes the first wedge 202 and the second wedge 204 to move in a first vertical direction relative to each other (e.g., drawing the first wedge 202 and the second wedge 204 towards each other), thereby increasing the width 128 of the wedge apparatus 102 and increasing a force that is exerted on the battery cells 104 by the wedge apparatus 102. Conversely, rotating the bolt 302 in a second direction causes the first wedge 202 and the second wedge 204 to move in a second vertical direction (which is opposite the first vertical direction) relative to each other (e.g., expanding the first wedge 202 and the second wedge 204 away from each other), thereby decreasing the width 128 of the wedge apparatus 102 and decreasing a force that is exerted on the battery cells 104 by the wedge apparatus 102. In some examples, upon installation in the battery module 100, the bolt 302 may be adjusted until the force exerted on the battery cells 104 by the wedge apparatus 102 is substantially equal to a predetermined force.

Figure 4:
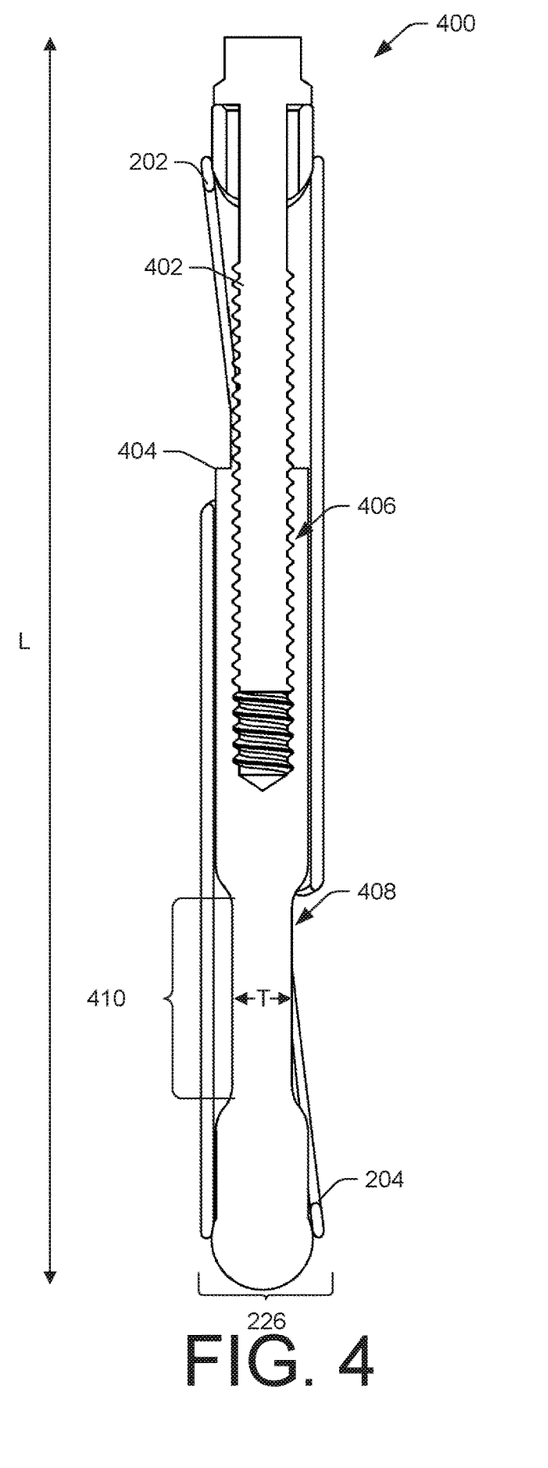
FIG. 4 is a cross-sectional view of an example wedge apparatus in accordance with an example of the present disclosure.

FIG. 4 depicts a cross-sectional view of the wedge apparatus 102 having an alternative tensioning mechanism 400. The tensioning mechanism 400 shown in FIG. 4 may be substantially similar to the tensioning mechanism 130 shown and described with respect to FIGS. 1-3. However, the tensioning mechanism 400 may include a deformable portion that allows the wedge apparatus 102 to exert a substantially constant force on the battery cells 104.

For example, the tensioning mechanism 400 may include a bolt 402 that is configured to be inserted at least partially into a threaded sleeve 404. The threaded sleeve 404 is configured to receive the bolt 402 therein such that rotating the bolt 402 in a first direction causes the first wedge 202 and the second wedge 204 to move in a first vertical direction relative to each other, thereby increasing the width 128 of the wedge apparatus 102 and increasing a force that is exerted on the battery cells 104 by the wedge apparatus 102. Conversely, rotating the bolt 302 in a second direction causes the first wedge 202 and the second wedge 204 to move in a second vertical direction (which is opposite the first vertical direction) relative to each other, thereby decreasing the width 128 of the wedge apparatus 102 and decreasing a force that is exerted on the battery cells 104 by the wedge apparatus 102.

The threaded sleeve 404 may include a hollow portion 406 and a solid portion 408. The hollow portion 406 of the threaded sleeve 404 is configured to receive and secure the bolt 402 therein. The solid portion 408 of the threaded sleeve 404 may be configured deform as the battery cells 104 expand. For example, as described above, the wedge apparatus 102 is configured to exert a first force on the battery cells 104. However, as the battery cells 104 expand, the battery cells 104 may exert a second force on the wedge apparatus 102 as the battery cells 104 grow in size within the housing. In some examples, the first force and the second force are exerted in opposite directions. As the battery cells 104 continue to expand, the second force will increase. As such, in some examples, the solid portion 408 of the threaded sleeve 404 may be configured to deform once the second force is substantially equal to and/or exceeds a threshold force. For example, as the battery cells 104 expand, the battery cells 104 will exert the second force on the wedge apparatus 102. Once the second force reaches and/or exceeds the threshold force, the solid portion 408 may be configured to deform, thereby causing a length 410 of the solid portion 408 to increase and causing an overall length "L" of the tensioning mechanism 400 to increase. As the length 410 of the solid portion 408 of the threaded sleeve 404 increases, a width 128 of the wedge apparatus 102 will decrease. By decreasing the width 128 of the wedge apparatus 102 as the battery cells 104 expand, the force exerted on the battery cells 104 by the wedge apparatus may be prevented from increasing above a predetermined threshold and/or may remain substantially constant.

In some examples, the solid portion 408 of the threaded sleeve 404 may be configured to deform via plastic deformation or elastic deformation. In either case, as the solid portion 408 deforms, the wedge apparatus 102 may exert a substantially constant force on the battery cells 104. In some examples, a thickness "T" of the solid portion 408 may be designed such that the solid portion 408 begins to deform once a force exerted on the wedge apparatus 102 by the battery cells 104 reaches and/or exceeds a threshold force. By designing the solid portion 408 of the tensioning mechanism 400 to deform once the force reaches the threshold force while the bolt 402 remains secured within the hollow portion 406, the force exerted on the battery cells 104 by the wedge apparatus 102 may remain substantially constant. As such, the wedge apparatus 102 described herein may prevent over compression of the battery cells 104 which could adversely affect the battery cells 104.

Figure 5:
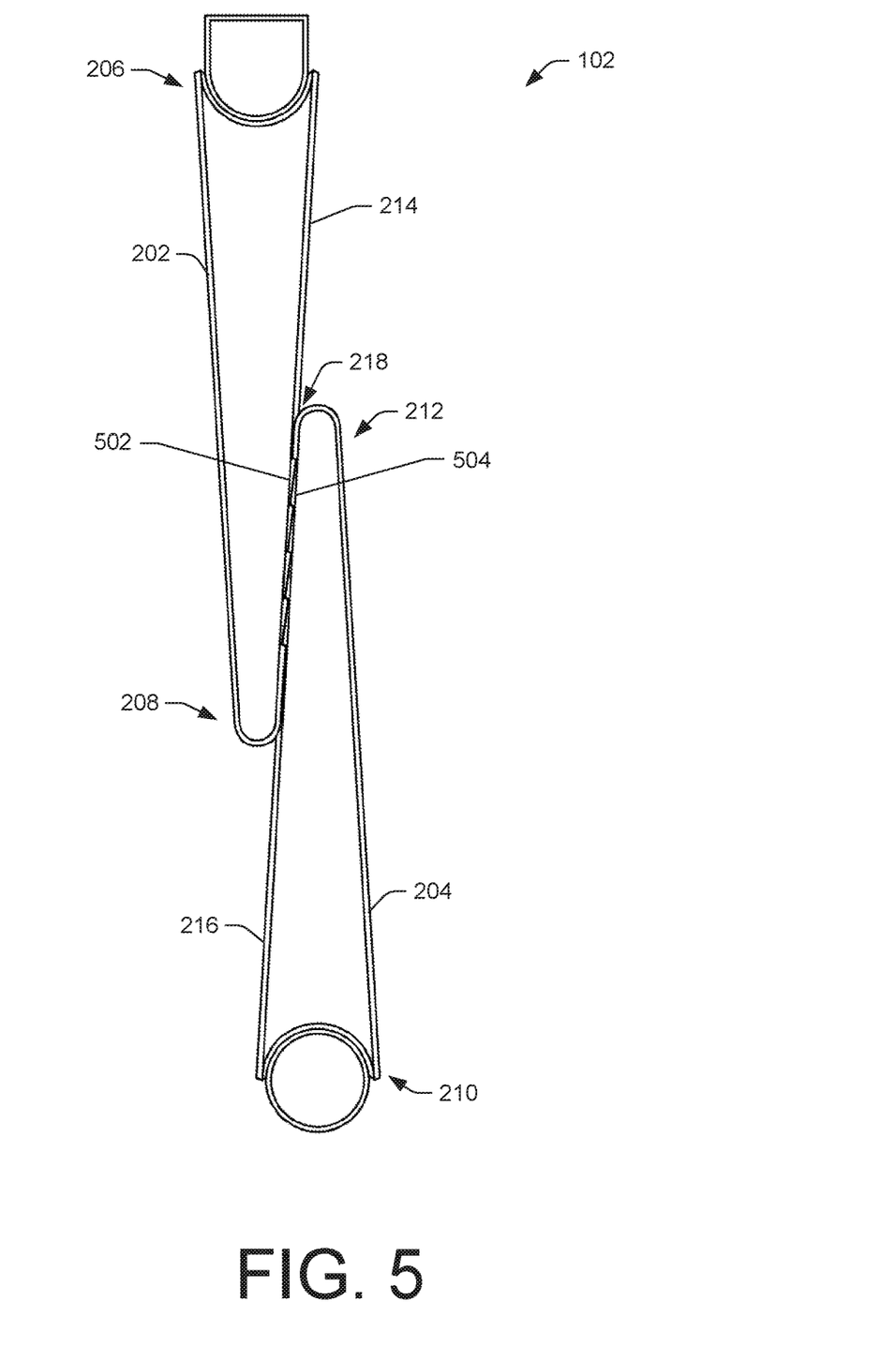
FIG. 5 is a side view of an example wedge apparatus in accordance with an example of the present disclosure.

FIG. 5 depicts a side view of the wedge apparatus 102. As described previously, the wedge apparatus 102 may include a contact interface 218 where the first wedge 202 and the second wedge 204 at least partially overlap and contact each other. In some examples, the contact interface 218 may include surface roughness or machined features. For example, the first wedge 202 includes the first face 214 that extends between the first thick end 206 and the first thin end 208 and at least a portion of the first face 214 contacts the second face 216 of the second wedge 204. The second face 216 of the second wedge 204 extends from the second thick end 210 to the second thin end 212. In some examples, the first face 214 of the first wedge 202 includes first ratchet teeth 502 formed in at least a portion thereof. Likewise, the second face 216 of the second wedge 204 includes second ratchet teeth 504 formed in at least a portion thereof. The first ratchet teeth 502 and the second ratchet teeth 504 may be configured to correspond to each other such that the first ratchet teeth 502 and the second ratchet teeth 504 interlock.

As described previously, the battery cells 104 may exert a force on the wedge apparatus 102 as the battery cells 104 expand. In some examples, the first ratchet teeth 502 and/or the second ratchet teeth 504 deform and/or slip if the force exerted on the wedge apparatus 102 by the battery cells 104 meets and/or exceeds a threshold force. As such, the first ratchet teeth 502 and the second ratchet teeth 504 allow the first wedge 202 and the second wedge 204 to move relative to each other such that the force that the wedge apparatus 102 exerts on the battery cells 104 remains substantially constant.

INDUSTRIAL APPLICABILITY

This disclosure generally relates to an apparatus that compresses battery cells secured within a housing of a battery module. The apparatus described herein is used to compress battery cells that tend to swell over a battery life of the battery cells, which can reduce performance, reduce the battery life, or damage the battery cells. The apparatus is adjustable to exert a predetermined force on the battery cells, thereby compressing the battery cells and reducing or slowing swelling of the battery cells. As such, the apparatus can improve performance of the battery cells, extend the battery life of the battery cells, and/or reduce or slow swelling of the battery cells. Furthermore, the apparatus described herein responds to battery cell swelling in order to ensure that the force exerted on the battery cells remains substantially constant.

According to some embodiments, a battery module 100 includes a housing 114, battery cells 104 disposed within the housing 114, and a wedge apparatus 102 disposed within the housing 114 and that exerts a substantially constant force on the battery cells 104. The wedge apparatus 102 includes a first wedge 202, and a second wedge 204, the first wedge 202 and the second wedge 204 positioned such that the first wedge 202 and the second wedge 204 at least partially overlap. The wedge apparatus 102 further includes a tensioning mechanism 130 that is adjustable to adjust a position of the first wedge 202 or the second wedge 204 relative to each other such that, when the tensioning mechanism 130 moves the first wedge or the second wedge in a first direction relative to each other, a width 128 of the wedge apparatus 102 expands exerting a first force on the battery cells 104.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A battery module comprising:
    a housing;
    a plurality of battery cells disposed within the housing; and
    a wedge apparatus disposed within the housing, the wedge apparatus including:
        a first wedge having a first thick end tapering to a first thin end and a first opening formed through at least a portion of the first wedge,
        a second wedge having a second thick end tapering to a second thin end and a second opening formed through at least a portion of the second wedge, the first wedge and the second wedge configured to at least partially overlap,
        a bolt configured to be inserted at least partially into the first opening, the bolt including threading formed in at least a portion of a shaft of the bolt,
        a rail separate from the second wedge that abuts the second thick end of the second wedge, and
        a threaded sleeve extending from the rail, wherein:
            the threaded sleeve has a first thickness at a first location along the length of the threaded sleeve and has a second thickness at a second location along the length of the threaded sleeve, the second thickness less than the first thickness with the second location positioned proximate the rail, and
            the threaded sleeve is inserted at least partially within the second opening and configured to receive the bolt at the first location therein such that rotating the bolt in a first rotational direction causes the first wedge to move in a first direction relative to the second wedge, thereby causing a width of the wedge apparatus to expand increasing a first force applied to the plurality of battery cells, and
        wherein the plurality of battery cells exerts a second force on the wedge apparatus as the plurality of battery cells expand, and the threaded sleeve includes at least a portion at the second location that is configured to deform once the second force is substantially equal to or exceeds a threshold force.

2. The battery module of claim 1, wherein the threaded sleeve includes a hollow portion and a solid portion, the solid portion of the threaded sleeve configured to deform once the second force is substantially equal to or exceeds the threshold force causing the first force exerted on the plurality of battery cells to remain substantially constant.

3. The battery module of claim 1, wherein the first force is a predetermined force that is determined based at least in part on one or more of a quantity of individual battery cells disposed within the housing, dimensions of the individual battery cells, a type of the individual battery cells, or an application of the battery module.

4. The battery module of claim 1, wherein rotating the bolt in a second rotational direction causes the first wedge to move in a second direction relative to the second wedge, reducing the width of the wedge apparatus and decreasing the first force exerted on the plurality of battery cells by the wedge apparatus.

5. The battery module of claim 1, wherein the first wedge includes a first face that extends between the first thin end and the first thick end, the first face including first ratchet teeth formed therein, and
    the second wedge includes a second face that extends between the second thin end and the second thick end, the second face including second ratchet teeth formed therein, the first ratchet teeth and the second ratchet teeth configured to interlock.

6. The battery module of claim 5, wherein the first ratchet teeth and the second ratchet teeth are configured to deform or slip as the plurality of battery cells expand, thereby allowing the first wedge and the second wedge to move in a second direction relative to each another such that the force exerted on the plurality of battery cells by the wedge apparatus is substantially constant.

7. The battery module of claim 1, wherein the wedge apparatus is disposed within the housing proximate an end of the housing such that the wedge apparatus exerts the first force on the housing of the battery module.

8. The battery module of claim 1, further comprising a compressible material inserted between individual battery cells of the plurality of battery cells and between the plurality of battery cells and the wedge apparatus.

9. The battery module of claim 1, wherein the first wedge and the second wedge comprise a polymer including polyoxymethylene.

10. A battery module comprising:
    a housing;
    a plurality of battery cells disposed within the housing;
    a wedge apparatus disposed within the housing and configured to exert a substantially constant force on the plurality of battery cells, the wedge apparatus including:
        a first wedge having a first thick end tapering to a first thin end, the first wedge including a first opening formed through at least a portion of the first wedge,
        a second wedge having a second thick end tapering to a second thin end and a second opening formed through at least a portion of the second wedge, the first wedge and the second wedge positioned such that the first wedge and the second wedge at least partially overlap, and
        a tensioning mechanism disposed at least partially in the first opening and the second opening and configured to move the first wedge in a first direction relative to the second wedge causing a width of the wedge apparatus to expand and exert a first force on the plurality of battery cells, the tensioning mechanism comprising:
- a rail separate from the second wedge that abuts the second thick end of the second wedge,
- a bolt configured to be inserted at least partially into the first opening, the bolt including a threaded shaft, and
- a threaded sleeve that extends from the rail and is inserted at least partially within the second opening, wherein the threaded sleeve has a first thickness at a first location along the length of the threaded sleeve and has a second thickness at a second location along the length of the threaded sleeve, the second thickness less than the first thickness with the second location positioned proximate the rail such that the threaded sleeve is configured to deform at the second location once the second force is equal to or exceeds the threshold force, and the threaded sleeve configured to receive the threaded shaft at the first location, wherein the plurality of battery cells exerts a second force on the wedge apparatus as the plurality of battery cells expand and the tensioning mechanism includes a portion thereof that is configured to deform once the second force is equal to or exceeds a threshold force.

11. The battery module of claim 10, wherein the threaded sleeve includes a hollow portion configured to receive the threaded shaft of the bolt therein, and the portion is a solid portion configured to deform once the second force is equal to or exceeds the threshold force causing the first force exerted on the plurality of battery cells to remain substantially constant.

12. The battery module of claim 10, wherein the first wedge includes a first face that extends between the first thin end and the first thick end, the first face including first ratchet teeth formed therein, and the second wedge includes a second face that extends between the second thin end and the second thick end, the second face including second ratchet teeth formed therein, the first ratchet teeth and the second ratchet teeth configured to interlock.

13. The battery module of claim 12, wherein the first ratchet teeth and the second ratchet teeth are configured to deform or slip as the plurality of battery cells expand, thereby allowing the first wedge and the second wedge to move in a second direction relative to one another such that the first force exerted on the plurality of battery cells by the wedge apparatus is substantially constant.

14. The battery module of claim 10, wherein the first force is a predetermined force that is determined based at least in part on one or more of a quantity of individual battery cells disposed within the housing, dimensions of the individual battery cells, a type of the individual battery cells, or an application of the battery module.

\* \* \* \* \*